(No Model.) 2 Sheets—Sheet 1.
S. & L. PECORD.
KITCHEN CABINET.
No. 406,766. Patented July 9, 1889.
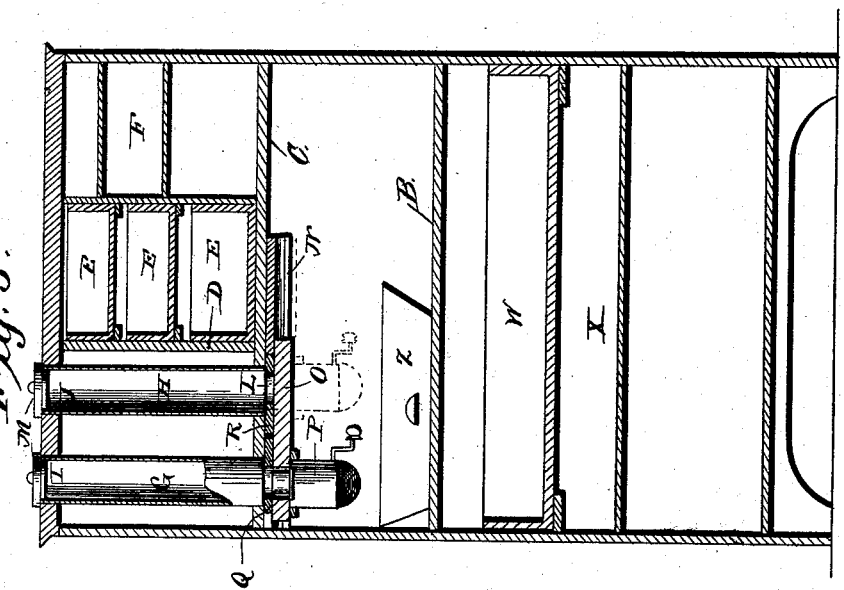
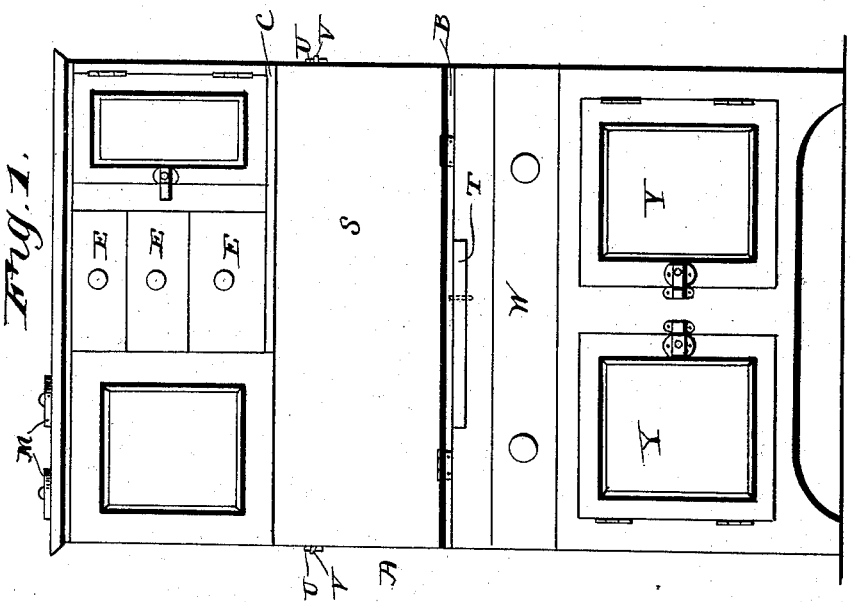
Witnesses
Inventors
Suplear Pecord
Levi Pecord
By their Attorneys
N. PETERS, Photo-Lithographer, Washington, D. C.

(No Model.) 2 Sheets—Sheet 2.
S. & L. PECORD.
KITCHEN CABINET.
No. 406,766. Patented July 9, 1889.
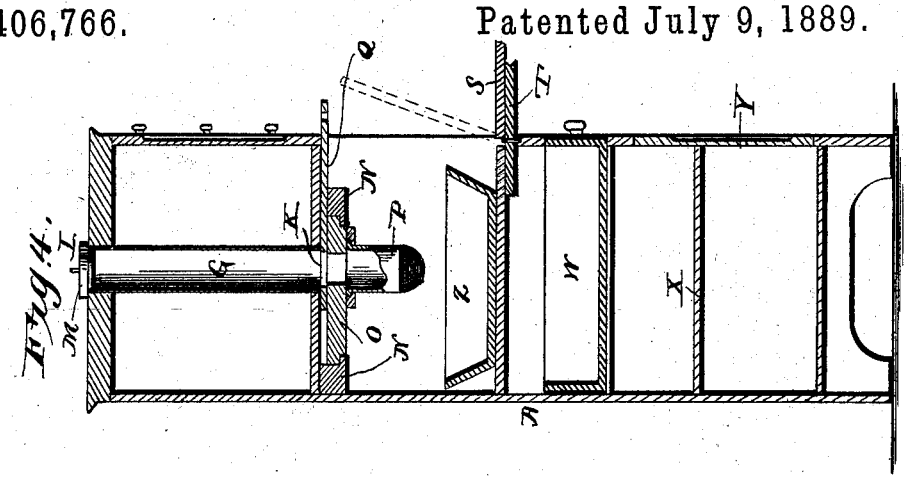
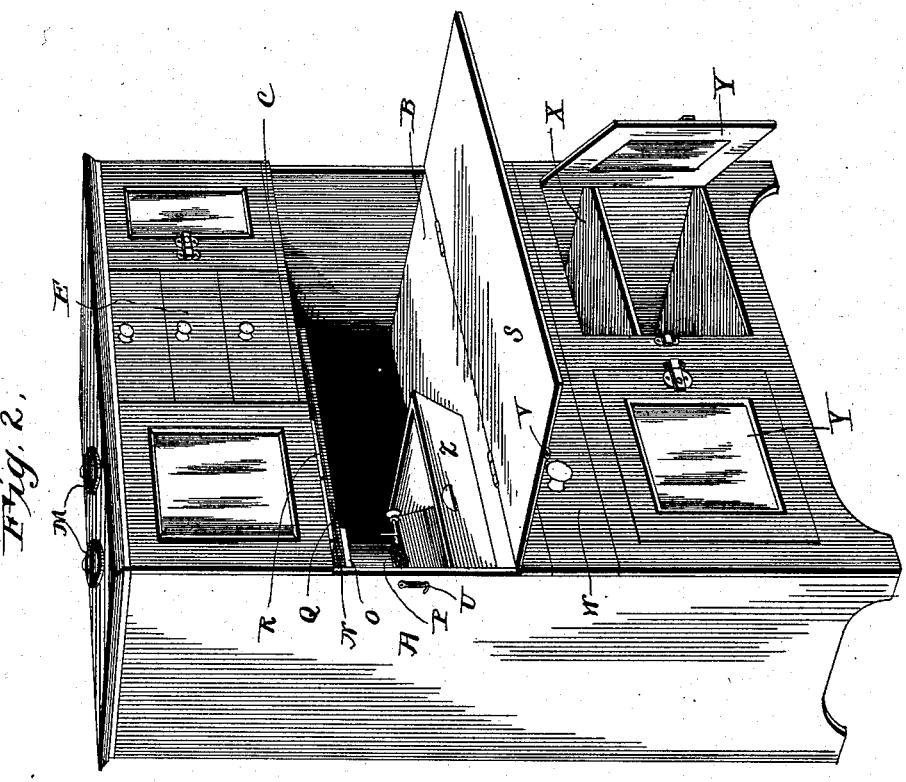

UNITED STATES PATENT OFFICE.

SUPLEAR PECORD AND LEVI PECORD, OF CONCORDIA, KANSAS.

KITCHEN-CABINET.

SPECIFICATION forming part of Letters Patent No. 406,766, dated July 9, 1889.

Application filed January 3, 1889. Serial No. 295,282. (No model.)

*To all whom it may concern:*

Be it known that we, SUPLEAR PECORD and LEVI PECORD, citizens of the United States, residing at Concordia, in the county of Cloud and State of Kansas, have invented new and useful Improvements in Kitchen-Cabinets, of which the following is a specification.

Our invention relates to improvements in kitchen-cabinets; and it consists in certain novel features hereinafter described and claimed.

In the accompanying drawings, Figure 1 is a front view of the device closed up. Fig. 2 is a similar view showing the drop-door lowered to form a bread-table, and showing one of the swinging doors open so as to display the interior construction. Fig. 3 is a vertical longitudinal section; and Fig. 4 is a transverse vertical section.

Referring to the drawings by letter, A designates the casing of our improved cabinet, which may be of any desired dimensions, and is provided at about its center and between its center and its top with the horizontal partitions B C, and between the upper partition C and the top we provide the vertical partition D, on one side of which we arrange a series of drawers E, to receive baking-powder, spices, fruits, sugar, &c., and between the said drawers and the side of the casing we provide the shelves F, which are adapted to support pies and cakes. On the opposite side of the partition D we arrange the flour and meal bins G H, which extend from the top of the casing to the horizontal partition C.

In the top of the casing we provide the feed-openings I J, through which the flour and meal are placed in the bins, and the bins are further provided in their lower ends with the discharge-openings K L. The feed-openings are normally closed by removable caps M, while the discharge-openings are adapted to be closed and opened at will by means of sliding valves.

To the under side of the partition C we secure the parallel ribs or cleats N, which are arranged longitudinally of the partition and support a slide O, which carries a sifter P, as shown. By properly moving this slide the sifter is brought beneath either the flour or meal bin, as will be readily understood. Near the side of the casing and just below the flour and meal bins we provide the slides Q R, which are arranged between the cleats N and the partitions C, and are adapted to open and close the discharge-openings in the bottoms of the bins.

The front of the space between the horizontal partitions D C is closed by a drop-door S, which is secured to the front of the casing and is adapted to be lowered, as shown in Fig. 2, so as to form a bread-board, and is supported in said casing by a horizontally-swinging arm T, which is pivotally mounted in the front of the casing below the said drop-door. The door is held in its raised position by hooks U, pivoted to the sides of the casing and engaging eyes V, secured in the edges of the drop-door.

Below the partition B we provide a drawer W, which is adapted to receive the bread-pans and pie-pans which are not in use, and below this drawer we arrange the shelf X, upon which the loaves of bread are placed, the space below the said shelf being provided for fruit-jars. Upon the front of the casing we provide the doors Y, which are adapted to close the space between the drawer W and the bottom of the casing.

Z designates a bread-pan, which is arranged below the sifter and is adapted to receive the flour or meal from the sifter.

From the foregoing description, taken in connection with the accompanying drawings, it will be seen that we have provided a very simple and compactly-arranged device, by which a large number of household articles can be conveniently stored away, and at the same time will allow of easy access to the articles.

When it is desired to use flour, the slide R is pushed inward, so as to close the discharge-opening of the meal-bin, while the slide Q is drawn outward, thereby unclosing the discharge-opening of the flour-bin, and the sifter is then brought into alignment with the flour-bin so that the flour will pass into the sifter. The sifter is then operated so as to clean the flour as it passes to the bread-pan. When it is desired to use meal, the slide Q is pushed inward and the slide R drawn outward, and the sifter placed below the meal-bin, as will be readily understood.

Having thus described our invention, what we claim, and desire to secure by Letters Patent, is—

1. In a kitchen-cabinet, the combination, with the casing having a horizontal partition C, and the flour and meal bins arranged between said partition and the top of the casing, of the slide O, supported by the said partition and carrying a sifter, and moving under the mouths of the bins so as to bring the sifter under either, and the independent transverse slides Q R, arranged between the partition and the slide O, and adapted to cover or uncover the mouths in the lower ends of the bins, as set forth.

2. The combination, with the casing having the horizontal partition C, and the flour and meal bins arranged between the said partition and the top of the casing, of the cleats N, secured to the under side of said partition, the slides Q R, arranged between said cleats and the partition and below the bins, and the slide O, supported by said cleats below the slides Q R, and carrying the sifter, and moving under the mouths of the bins so as to bring the sifter under either, as set forth.

3. In a kitchen-cabinet, the bins G H, arranged side by side, combined with the slide O, carrying a sifter, and adapted to register with the mouth of either one of the bins, as set forth.

In testimony that we claim the foregoing as our own we have hereto affixed our signatures in presence of two witnesses.

SUPLEAR PECORD.
    LEVI PECORD.

Witnesses:
 GEORGE PELLETIER,
 E. D. PELLETIER.